J. GAUNT & W. F. POIESZ.
Centrifugal Machine.
No. 220,824.    Patented Oct. 21, 1879.
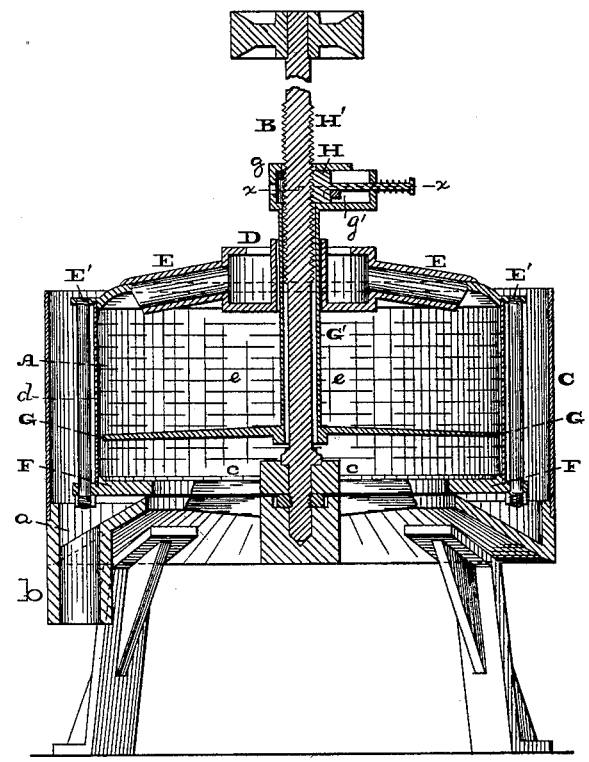
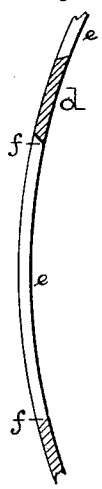
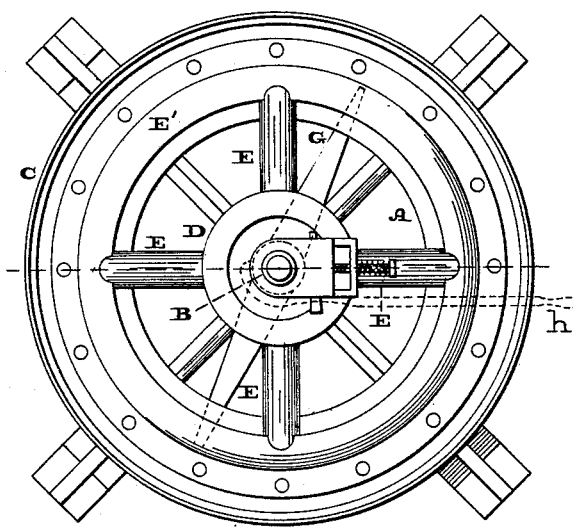
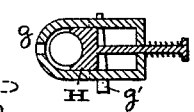
Witnesses:
A. P. Grant,
W. F. Kircher
Inventors:
John Gaunt,
Wm. Poiesz,
by John A. Wiedersheim
ATTORNEY.

UNITED STATES PATENT OFFICE.

JOHN GAUNT, OF GLOUCESTER CITY, NEW JERSEY, AND WILLIAM F. POIESZ, OF PHILADELPHIA, PENNSYLVANIA.

IMPROVEMENT IN CENTRIFUGAL MACHINES.

Specification forming part of Letters Patent No. 220,824, dated October 21, 1879; application filed January 25, 1879.

*To all whom it may concern:*

Be it known that we, JOHN GAUNT, of Gloucester City, in the county of Camden and State of New Jersey, and WILLIAM F. POIESZ, of the city and county of Philadelphia, and State of Pennsylvania, have invented a new and useful Improvement in Centrifugal Machines, which improvement is fully set forth in the following specification and accompanying drawings, in which—

Figure 1 is a central vertical section of the machine embodying our invention. Fig. 2 is a top or plan view thereof. Fig. 3 is a horizontal section of a portion in line $x\,x$, Fig. 1. Fig. 4 is a horizontal section of a portion of the basket enlarged.

Similar letters of reference indicate corresponding parts in the several figures.

Before our invention centrifugal machines have been made in which the basket was composed of a corrugated shell or outer wall having rather wide horizontal slots in the grooves and an inner lining of wire-cloth. This wire-cloth effects the drainage, and the corrugated outer shell strengthens and supports the wire lining, and its slots admit of the escape of the drainage liquid, but such outer shell does not alone effect the drainage. Also, before our invention, there was known a centrifugal machine in which there was an inner basket carrying a scraper, below which was arranged a conical copper vessel having vertical elongated perforations of conical shape, the apexes of these cones being inside.

In order to effect the rapid discharge of the liquid in a basket with vertical perforations, such perforations must be close together, and the basket is to this extent rendered weak. In making such perforations with conical or flaring sides, so much metal is removed as to further reduce the strength of the basket.

A shell of such ductile metal as copper would necessarily be unable of itself to withstand the great pressure exerted upon a centrifugal basket, and in this present instance such a shell is, besides, weakened in the line of pressure by slits or incisions. To afford a stay for such baskets, inner basket linings or supports of some sort must be used, or the basket must be of unusual or disadvantageous shape to compensate for its inherent weakness. The wire linings of baskets have been found to wear out in eight days. They need frequent repairs and are otherwise expensive.

Our invention is designed to provide a hard-metal shell for the basket of a centrifugal machine, whereby a netting or wire-cloth in basket is dispensed with, and the drainage of the sugar or other stuff is effected solely and directly by the one shell.

Our invention consists in a basket for a centrifugal machine the wall or shell of which is of a strong metal provided with very fine or narrow horizontal slits, having their horizontal edges or walls parallel throughout their lengths and through the thickness of the shell, and their ends or sides flaring or not, as desired, whereby the shell alone and directly effects the drainage without a wire or other lining.

The invention also consists in a distributer arranged about the shaft of the machine above the basket, leaving open the top of such basket, and having tubular feeding-arms that additionally serve to brace and strengthen the basket.

The invention also consists in providing an open top and bottom basket with a scraper adapted to travel in the direction of the height of the basket, and operated at pleasure by a clutch mechanism engaging the shaft and scraper-carrier, as hereinafter claimed.

Referring to the drawings, A represents a basket, B the vertical shaft thereof, and C the case surrounding the basket, with an intervening space, and provided with a trough, $a$, at the bottom, with which communicates an outlet-spout, $b$.

D represents a receiving and distributing chamber, which is located centrally of the top of the basket, and from the same radiate tubes or tubular arms E, whose outer ends, connected to the top rim, E′, or upper end of the basket, open into the basket.

At the bottom of the basket there is secured a narrow rim or ledge, F, and the bottom is thus left continuously open, excepting at the portion occupied by said narrow rim and the arms $c$, which connect the shaft B and basket.

In the circumferential wall or shell d, which is clamped by bolts between the upper and lower rims, E' F, there are cut by a milling or slotting machine, or other means, kerfs, slits, or openings e, the sides of which are flaring, as at f f.

G represents one or more scrapers, which, connected to a sleeve, G', fitted freely or loosely on the shaft B, and within the hub of the receiver D, are adapted to sweep the inner face of the basket A. To the upper end of the sleeve G' is connected a box, g, within which is fitted a tap, H, whose threads coincide with threads H' on the shaft B. The tap has a sliding motion in the box g, in order to be engaged with and be disengaged from the shaft B, either motion being accomplished by a suitable spring or by hand, and the tap may be held engaged or disengaged by means of a pin, wedge, or other appliance, g'.

During the operation of the scraper the box g is necessarily prevented from rotation, to accomplish which it is held by a hand wrench or key, h, or other means.

The operation is as follows: Power is applied to the shaft B and the material introduced into the chamber D, from whence it is directed by centrifugal action through the arms E into the basket A, and then again forced by similar action against the inner face of the circumferential wall of the same, where the solid matters collect, while the fluid portion of the material is driven through the kerfs, slits, or openings e, and falls or flows into the trough a, and through the spout b to a place of deposit.

The kerfs, slits, or openings provide ample and reliable discharge-openings for the drainage of the fluid, and, owing to the flaring sides f of said kerfs or slits, the fluid quickly leaves the outer face of the wall d, and clogging is prevented. Furthermore, we obviate perforated plates and wire sieves as linings, and as the kerfs, slits, or openings are sufficiently fine, the shell alone directly effects the drainage.

The wrench or key h is applied to the box g, so as to prevent its rotation, and as the tap H engages with the threads H' of the shaft B, vertical motion is imparted to the scrapers G, whereby the collected solid matters on the inner face of the basket are loosened and liberated, and they fall through the open bottom of the basket while running, from whence they may be directed to a place of deposit.

When the scrapers reach their highest point the pin g' is removed, and the tap H shifts or is shifted from the threads H', whereby the box and appurtenances and the scrapers fall to their lowest or starting point, after which the tap is again forced in and the pin g' properly applied, so that, when required, the scrapers may again be caused to ascend and operate.

As the tubular arms E connect the upper end of the basket A and the chamber D, they serve in a measure to strengthen said upper end; but additional connecting arms or braces may be employed.

By this construction of the distributer the top of the basket is left open and free for access without the removal of the parts—a desideratum not possible with other forms.

Owing to the open bottom of the basket, and the consequent provision for discharging the solid matters therethrough, the inconvenient removal of such matters from the basket by hand is obviated.

Having thus described our invention, what we claim as new, and desire to secure by Letters Patent, is—

1. A basket for a centrifugal machine the shell or wall e of which is of strong metal provided with very fine or narrow horizontal slits, having their horizontal edges or walls parallel throughout their lengths and through the thickness of the wall or shell, and their ends or sides flaring or not, as desired, for the purpose of directly effecting the drainage solely by means of said slitted shell without the intervention of a wire or other lining, substantially as described.

2. The distributer D, arranged about the shaft B above the basket, leaving open the top of such basket, in combination with the bracing and strengthening tubular arms E, connected to the upper rim of and feeding the basket, substantially as described.

3. The rising-and-falling scraper G, adapted to travel the height of the basket, in combination with the slitted shell d and the open bottom, substantially as described.

4. The combination of a rising-and-falling scraper, G, a nettingless basket, A, open top and bottom, and the feeding and strengthening distributer D, having the tubular arms E, all constructed and arranged substantially as described.

5. The draining-basket provided with a rising-and-falling scraper or scrapers, whereby the collected substance may be disengaged while the basket is running, substantially as and for the purpose set forth.

6. The combination, with the scraper or scrapers and the connecting-sleeve G', of the box g, having a shifting tap, H, substantially as and for the purpose set forth.

JOHN GAUNT.
WIL. F. POIESZ.

Witnesses:
JOHN A. WIEDERSHEIM,
H. E. GARSED.